May 17, 1960 C. R. CLASS ET AL 2,937,076
PROCESS FOR THE PRODUCTION OF PARA LIQUID HYDROGEN
Filed Dec. 13, 1957 2 Sheets-Sheet 1

INVENTOR
CHARLES R. CLASS
RAYMOND P. SPERO
GLEN E. McINTOSH
BY Philip S. McLean
ATTORNEY May 17, 1960   C. R. CLASS ET AL   2,937,076
PROCESS FOR THE PRODUCTION OF PARA LIQUID HYDROGEN
Filed Dec. 13, 1957   2 Sheets-Sheet 2

INVENTOR
CHARLES R. CLASS
RAYMOND P. SPERO
GLEN E. McINTOSH

Philip S. McLean
ATTORNEY

United States Patent Office 2,937,076
Patented May 17, 1960

2,937,076

PROCESS FOR THE PRODUCTION OF PARA LIQUID HYDROGEN

Charles R. Class, Boulder, Raymond P. Spero, Arvada, and Glen E. McIntosh, Boulder, Colo., assignors to Beech Aircraft Corporation, Wichita, Kans., a corporation of Delaware Application December 13, 1957, Serial No. 702,582

5 Claims. (Cl. 23—210)

The present invention relates to a process for the production of hydrogen, and more particularly, to a process for the production of stable liquid para hydrogen that is capable of being stored economically.

Hydrogen exists in two forms, one form being ortho hydrogen and the other para hydrogen. Ortho hydrogen is known as an unstable, high energy type, while the para hydrogen may be designated as a stable, lower energy type, with the two types or forms possessing slightly different physical properties, such as, for example, specific heat and vapor pressure. Hydrogen when in an equilibrium state consists generally of a mixture of the ortho and para forms of hydrogen, with the ratio being dependent upon the temperature at which the hydrogen is maintained. This is best illustrated by reference to the following table:

| Temperature | Percent ortho hydrogen | Percent para hydrogen |
|---|---|---|
| −252.8° C | 0.21 | 99.79 |
| −195.4° C | 50.0 | 50.0 |
| 20° C | 75.0 | 25.0 |

From the foregoing, it is seen that the equilibrium concentration of the ortho and para hydrogen mixture is a temperature function with the ortho form converting to the para form at low temperatures according to an exponential time delay period. The change from the ortho to para form is always accompanied by liberation of heat. For example, when converting hydrogen from 20° C. to −252.8° C., the heat of conversion is 226.8 B.t.u./lb.

In liquefying hydrogen, particularly for storing same, several problems exist which are undesirable from an economical standpoint and limit the use of liquid hydrogen. For example, when normal hydrogen is passed to a liquefier, the liquid hydrogen produced consists generally of 75% ortho hydrogen and 25% para hydrogen. The liquid hydrogen produced then, through an inner molecular reaction, self-converts the unstable ortho form to the paraform with a corresponding liberation of heat in the process. During this self-conversion, the heat generated tends to boil off most of the liquid mixture until an equilibrium state for the hydrogen is reached. By way of example, if normal liquid hydrogen is stored in a perfectly insulated vessel, such as a Dewar flask, approximately 75% of the normal liquid hydrogen would boil away as a result of the heat generated by the hydrogen self-conversion, with some 20% loss during the first twenty-four hours. Thus, heretofore storage of liquid hydrogen has been possible only by employing heavy, cumbersome, refrigerating equipment. This is obviously highly undesirable from an economical standpoint. Moreover, it limits the use of liquid hydrogen only to areas where such refrigeration machinery is available.

It is therefore a principal object in the elimination of the foregoing related disadvantages to provide a process for producing the para form of liquid hydrogen from normal hydrogen gas in a new and novel manner.

Another object of the present invention is to provide a process for the production of a stable para form of liquid hydrogen which is capable of being stored economically and without requiring expensive refrigeration equipment, and may be used at any desired place.

Yet another object of the present invention is a process for the production of the para form of liquid hydrogen which possesses a high yield of liquid hydrogen per unit of hydrogen gas circulated without necessitating a high power consumption.

Still another object of the present invention is a process for producing the para form of liquid hydrogen during the liquefying operation thereby eliminating a self-conversion of the liquid hydrogen to the para form.

A still further object of the present invention is a process for producing the para form of liquid hydrogen in which a catalyst is employed in the liquefying operation to convert the hydrogen to the para form.

A still further object of the present invention is a method for producing the para form of liquid hydrogen in which a low pressure system is employed with a high yield of para liquid hydrogen being produced per unit of hydrogen gas circulated.

Still another object of the present invention is a method for producing the para form of liquid hydrogen in which the operation is virtually self-contained.

Yet another object of the present invention is a method for producing the para form of liquid hydrogen by a continuous conversion operation whereby the ortho form of the hydrogen gas is converted to para form as its temperature is lowered prior to liquefaction.

Other and additional objects will become manifest from the ensuing description taken in conjunction with the accompanying drawings.

Broadly stated, the method for producing the para form of liquid hydrogen in accordance with the present invention comprises passing hydrogen gas under pressure to a first heat exchange zone to effect a cooling thereof, passing the cooled gas to a second refrigerated heat exchange zone to further cool the gas, said second heat exchange zone having a para magnetic oxide catalyst present therein to convert a part of said hydrogen gas passed therein to the para form, passing said partially converted gas through at least one more heat exchange zone to effect further cooling of said partially converted gas, passing the gas leaving the last heat exchange zone through an expansion zone to effect a partial liquefaction of said gas, passing the partially liquefied gas to a receiving zone, said receiving zone provided with a para magnetic oxide catalyst to convert the liquefied hydrogen to the para form, and passing the gaseous hydrogen back through at least some of the heat exchange zones to effect the cooling of the incoming gas.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawings, in which.

Figure 1:
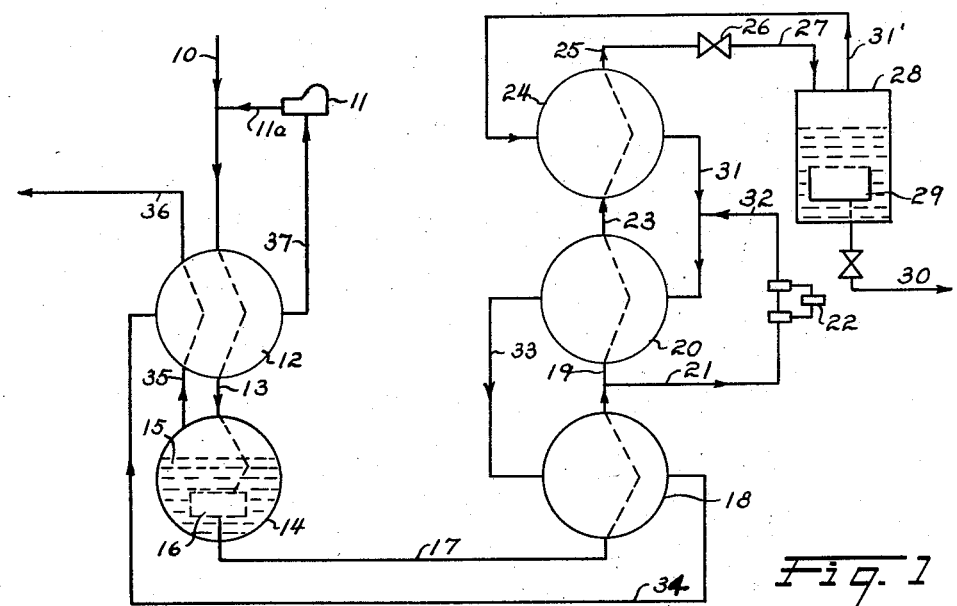
Figure 1 is a diagrammatic view of a flow sheet illustrating one method made in accordance with the present invention for producing the para form of liquid hydrogen.

Reference is now to be had to Fig. 1 wherein one illustrative embodiment of a method made in accordance with the present invention is shown by way of a diagrammatic flow sheet. A stream of normal hydrogen gas under pressure enters line 10 and is passed into a first heat exchanger 12 where an initial cooling of the compressed gas occurs by a heat exchange relationship with cold hydrogen gas. The cold hydrogen gas is obtained from the liquid hydrogen produced by the process and is recycled back through the system in reverse order in a manner which will become more apparent as the description of the process ensues. It is to be noted that low pressure hydrogen may be employed by passing same to a compressor 11 which will feed hydrogen under pressure through line 11a into the feed-stream in line 10. When hydrogen gas under pressure is initially employed without requiring compression, the compressor 11 serves to receive low pressure hydrogen gas coming from the heat exchanger 12 as a result of the reverse cycle operation, compress same and pass it into the feed-stream line 10 as make-up hydrogen, thereby fully utilizing all of the hydrogen gas put into the system.

The cooled compressed gas passes from the heat exchanger 12 through line 13 into a pre-cooling heat exchanger 14 where the gas is cooled further. The cooling of the gas is effected in this form of the invention by providing the heat exchanger 14 with a suitable liquid refrigerant, such as, for example, liquid air, liquid nitrogen, liquid oxygen, Freon 14, etc. This enables the hydrogen gas passing therethrough to be cooled to the temperature of the refrigerant. In this form of the invention, no cooled hydrogen gas obtained by the reverse cycle operation of the system will be employed to assist in cooling the gas. The heat exchanger 14 is additionally provided with a conversion catalyst 16 for converting the compressed hydrogen gas after it has been cooled approximately to the temperature of the refrigerant. The catalyst 16 serves to convert a portion of the compressed, cooled, normal hydrogen gas to the para form of hydrogen, since by converting a portion of the gas to the para form at this temperature level and removing the heat of conversion, the heat load in the final conversion operation is reduced. The conversion of the gas cannot be carried to completion in this operation since conversion is a temperature function and cannot be carried to completion at the temperature of the refrigerant. The partially converted gas is cooled back after conversion to the temperature level of the refrigerant in the pre-cooler heat exchanger before passing therefrom. The temperature of the pre-cooled heat exchanger 14 may be varied, if desired, by varying the refrigerant and the pressure at which the refrigerant is maintained.

The conversion catalyst 16 present in the heat exchanger 14 may be any suitable para magnetic oxide capable of converting the normal hydrogen gas to the para form during the conversion operation. Illustrative examples of suitable oxides for use in the present invention are iron oxide, hydrous iron oxide, chromic oxide, cerium oxide, etc. If desired, the catalyst may be carried on a suitable support, such as, for example, alumina and like materials which have been widely used for such a purpose.

The cooled, partially converted, compressed hydrogen gas passes from the pre-cooling heat exchanger 14 through line 17 to a third heat exchanger 18 where further cooling of the gas is to be effected. The hydrogen gas is cooled in the third heat exchanger 18 by means of cold hydrogen gas passing therethrough in a reverse cycle operation, and is derived from the liquid hydrogen product produced in the system. This stage of cooling is important since it enables the full utilization of the cold hydrogen gas in the reverse cycle operation to effect the cooling of the compressed gas in separate stages with refrigeration medium that would otherwise be unavailable in subsequent or one stage cooling operations.

The cooled, partially converted hydrogen gas still under pressure leaves the third heat exchanger 18 through line 19 and is split into two feeds, one part of the feed passing through line 19 to a fourth heat exchanger 20, with the remaining part going through line 21 to an expander 22 where it is expanded and passed into the reverse cycle operation side of the system to effect cooling in the heat exchangers in a manner more particularly described hereinafter. The portion of the hydrogen gas passing through line 19 into the heat exchanger 20 is further cooled therein by means of the cold hydrogen gas passing therethrough in the reverse cycle heat exchange operation, which is obtained from the ultimately produced liquid end product. The cooling of the hydrogen gas to the desired level in the heat exchanger 20 is materially enhanced since the portion of the incoming hydrogen gas divided out of the feed-stream for passage into the reverse recycle side of the system is fed thereinto at a point just prior to the entry of the reverse cooling stream into the heat exchanger 20, as will be more fully described hereinafter.

The partially converted hydrogen gas leaves the heat exchanger 20 at a very low temperature through line 23 into a fifth heat exchanger 24. The gas is finally cooled in heat exchanger 24 by the very cold hydrogen gas returning in the reverse cycle heat exchange operation from the liquid product produced. The hydrogen gas leaves heat exchanger 24 through line 25 and passes into an expansion valve 26 where a portion of the cooled hydrogen is liquefied as well as a part of the liquefied portion being converted to the para form of hydrogen. The liquefied portion and remaining cold gas passes through line 27 into the liquid hydrogen receiver 28. The partially converted liquid hydrogen is then forced through a liquid phase ortho para converter 29 positioned in the receiver 28. The liquid para hydrogen thus produced may be continually withdrawn for storage from the receiver 28 through line 30, and will be in a very stable form. The converter 28 is provided with a conversion catalyst of the same type as catalyst 16 in the pre-cooling heat exchanger 14.

The unliquefied gas passing into the receiver 28 from the expansion valve 26 is not liquefied but is passed back through at least some of the heat exchangers of the system in a reverse cycle heat exchange operation to provide the desired refrigeration for cooling the incoming gas by heat exchange relationship. In addition, the heat that is liberated during the conversion of the liquid hydrogen gas boils some of the liquid hydrogen in the receiver 28, thereby gasifying it. This gas combines with the unliquefied portion of the incoming hydrogen gas to serve as the cooling medium in the reverse cycle heat exchange operation. The combined unliquefied hydrogen gas leaves the receiver 28 through line 31' and is passed into the heat exchanger 24 where it serves as a refrigerant for the incoming, compressed, partially converted hydrogen gas. The hydrogen gas passes from the heat exchanger 24 by line 31 back through the heat exchanger 20 in the reverse cycle phase of the system. During passage from heat exchanger 24 back through heat exchanger 20, the portion of the incoming, compressed hydrogen feed-stream which was separated and passed through line 21 to the expander 22 is fed into line 31 before entry into heat exchanger 20. This operation provides a very cold stream of hydrogen gas to impart the desired refrigeration to the heat exchanger 20.

The hydrogen gas leaves the heat exchanger 20 through line 33 and is carried through the heat exchanger 18 to provide the necessary refrigeration to effect the desired cooling of the incoming hydrogen stream. The hydrogen gas leaves the heat exchanger 18 through line 34 and is passed back into the first heat exchanger 12 where it provides at least part of the refrigeration by heat exchange relationship for the initial cooling of the incoming compressed hydrogen gas. The pre-cooling heat exchanger 14 is provided with a line 35 which extends through the first heat exchanger 12. The line 35 will carry off volatilized refrigerant from the pre-cooling heat exchanger 14 to assist in providing additional cooling for the heat exchanger 12 in the initial cooling of the incoming hydrogen. The volatilized refrigerant leaves the heat exchanger 12 by line 36 and is passed to the atmosphere, or may be passed to a pump for recovery and ultimate re-use in the system.

It is to be noted in this form of the invention the low pressure hydrogen gas used in the reverse cycle operation by-passes the pre-cooling heat exchanger 14, since in general the refrigerant used in the heat exchanger 14 will provide adequate cooling of the incoming hydrogen gas at this stage of the process. The low pressure hydrogen gas leaves the heat exchanger 12 through line 37 and is carried to the compressor 11 where it is compressed and then added to the incoming, normal hydrogen gas under pressure. Alternatively, if all of the incoming, normal gas is not under pressure and must first be compressed by compressor 11, the hydrogen gas from the heat exchanger 12 will be employed as make-up gas. In either operation, the hydrogen gas from the reverse cycle operation will insure the maintaining of the system in a balanced state.

From the foregoing description of one form of the invention shown in Fig. 1, it is seen that the compressed hydrogen gas is cooled in the stepwise relationship by passage through a plurality of heat exchangers with each heat exchanger having a temperature lower than the preceding one. Conversely, the hydrogen recycle gas which is not under pressure and which is obtained from the vaporization of the liquid products as well as splitting off and expanding a portion of the cooled hydrogen feedstock passes through at least a portion of the heat exchanger to provide the necessary refrigeration. It will be noted that the gas leaving each heat exchanger in reference order gradually becomes warm. It is to be understood that in the present form of the invention, together with subsequent additional forms to be described, the number of heat exchangers may vary. The number of heat exchangers should be sufficient to permit a stepwise cooling of the incoming gas in an efficient manner with most of the refrigeration being derived from the feedstock itself by a reverse cycle operation.

Figure 2:
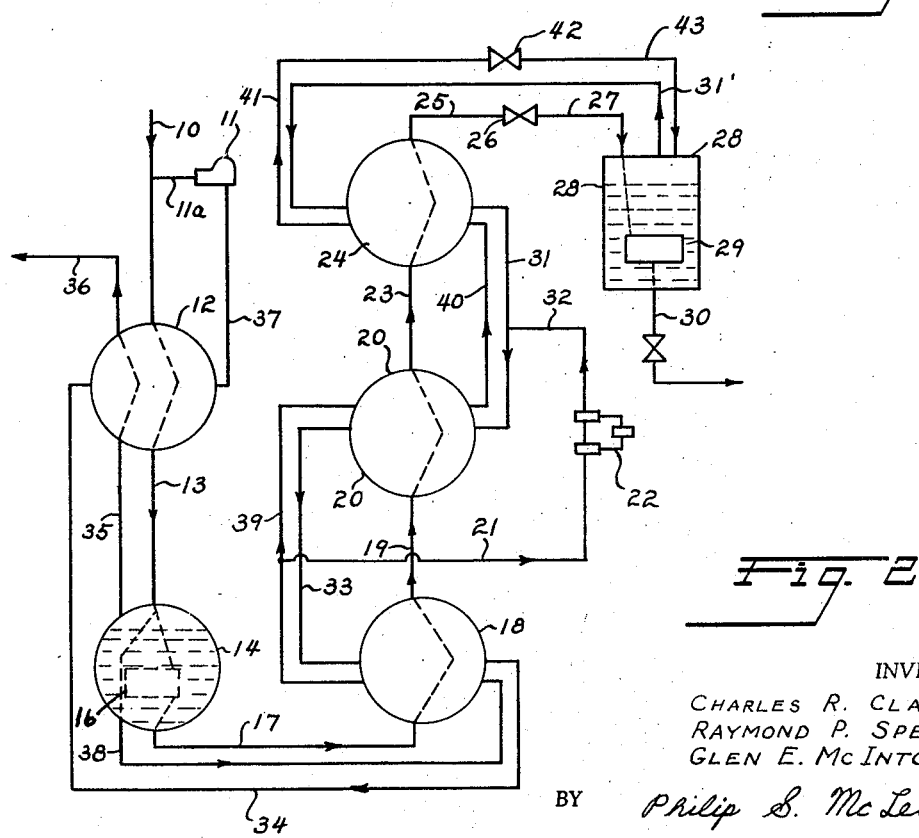
Fig. 2 is a diagrammatic view of a flow sheet illustrating a modified form of the method shown in Fig. 1.

Reference is now to be had to Fig. 2 wherein a modified form of the method shown in Fig. 1 is represented. Corresponding parts in the flow sheets of Figs. 1 and 2 will be designated by like reference numerals. In the form of the invention illustrated in the flow sheet of Fig. 2, a stream of normal hydrogen gas, either under pressure or compressed by compressor 11, will be passed to the heat exchanger 12 to effect its initial cooling. The partially cooled hydrogen feedstock is then passed through line 13 into the pre-cooling heat exchanger 14 where it is subjected to further cooling and partial conversion to the para form of hydrogen in the presence of the catalyst 16.

Prior to conversion, the hydrogen feedstock flow is split so that only the finally liquefied portion of the hydrogen feedstock which leaves the system by line 30 passes through the catalyst.

The portion of the hydrogen gas converted to the para form in the pre-cooling heat exchanger 14 is passed from the pre-cooling heat exchanger 14 through line 17 into the third heat exchanger 18 for further cooling. The converted portion of the compressed hydrogen feedstock leaves the third heat exchanger 18 by line 19 through the heat exchanger 20. After being further cooled in the fourth heat exchanger 20, the converted feed-stream is passed through line 23 into the fifth heat exchanger 24, and after further cooling therein, leaves by line 25 where it is expanded through an expansion valve 26. The expansion of the converted portion of the hydrogen feed-stream results in a partial liquefaction of the converted portion. This mixture of converted liquid and gaseous hydrogen is passed through receiver 28 in a closed system where the unliquefied portion is condensed causing the unconverted liquid hydrogen in receiver 28 to vaporize. The advantage of splitting off the converted portion of the hydrogen feed-stream and carrying it through to liquefaction in the closed system eliminates the possibility of back conversion at higher temperatures because there is no recirculation of the converted gas.

At the same time, the unconverted portion of the hydrogen gas feed-stream passes from the pre-cooling heat exchanger 14 through the third, fourth, and fifth heat exchangers 18, 20 and 24, respectively, through lines 38, 39, and 40, respectively, to effect the desired stepwise cooling. A portion of the feed-stream is divided in order to obtain a part which may be expanded isentropically and passed to the reverse cycle side of the system to impart refrigeration in the manner described with the flow sheet shown in Fig. 1. The unconverted, cooled hydrogen gas leaves the fifth heat exchanger 24 by line 41 where it is expanded through the expansion valve 42 to effect its partial liquefaction with the liquid then collected in receiver 28 and the gas passed to the reverse cycle side of the system to impart partial refrigeration. Thus the basic difference between the process shown in the flow sheet of Fig. 1 and the flow sheet of Fig. 2 is that in Fig. 2 the converted portion of the hydrogen feed-stream is divided from the main stream in the pre-cooling heat exchanger and passed continuously through to liquefaction while remaining in a converted state. The remaining portion of unconverted feedstock is passed through the system in the same manner as shown in the flow sheet of Fig. 1.

Figure 3:
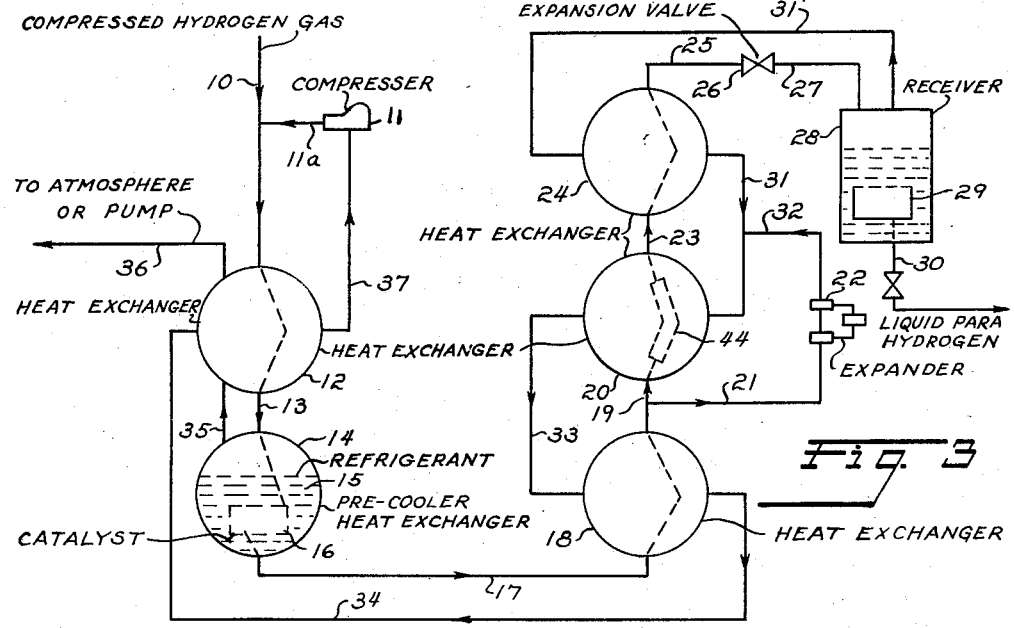
Fig. 3 is a diagrammatic view of a flow sheet illustrating another method made in accordance with the present invention in which there is a continuous conversion of the hydrogen to the para form of liquid hydrogen.

Reference is now to be had to Fig. 3 wherein another illustrative embodiment of a method made in accordance with the present invention is shown by way of a diagrammatic flow sheet. Parts in Fig. 3 which correspond to parts shown in the form of the invention in Fig. 1 will be designated by like reference numerals.

A stream of normal hydrogen gas, either under pressure or compressed by means of compressor 11, enters line 10 and is passed into a first heat exchanger 12 to effect an initial cooling of the compressed gas. The cooled compressed gas passes from the heat exchanger 12 through line 13 into a pre-cooling heat exchanger 14 where the gas is further cooled. A portion of the cooled hydrogen gas is converted in heat exchanger 14 to the para form of hydrogen by the contact with the catalyst 16. The cooled, partially converted, compressed hydrogen gas leaves the pre-cooling heat exchanger 14 through line 17 to a third heat exchanger 18, where a further cooling of the gas is accomplished.

The partially converted hydrogen gas leaves the third heat exchanger 18 through line 19 and is split into two feeds, with one part passing to a fourth heat exchanger 20 for further cooling, with the remaining part being expanded isentropically by the expander 22 for passage back through the reverse cycle side of the system to aid in providing refrigeration to the various heat exchangers. The operation of the method to this point is identical with the operation of the form of the invention shown in Fig. 1.

In the form shown in Fig. 3, the portion of the hydrogen gas going through line 19 to the fourth heat exchanger 20 passes through a catalyst converter 44 which is provided therein for contact with the catalyst 16. The further conversion of the previously partially converted hydrogen gas to the para form is advantageous at this point since continuous conversion occurs with the heat of conversion correspondingly being removed as the hydrogen gas is being cooled in exchanger 20. This operation reduces the heat load in the liquid hydrogen receiver thereby aiding in the efficiency of the system. The further converted hydrogen gas leaves the fourth heat exchanger 20 through line 23 into the fifth heat exchanger 24 where final cooling of the gas is achieved. The further converted hydrogen gas passes from the fifth heat exchanger 24 through line 25 to an expansion valve 26 where, upon expansion of the gas, partial liquefaction of the hydrogen is accomplished, with the liquid being collected in the liquid receiver 28 and the gas passed to the reverse cycle side of the system to impart refrigeration for the heat exchangers. Final conversion of the liquid hydrogen is accomplished by contact with the catalyst converter 29 present in the receiver 28.

Thus it is seen that the form of the invention illustrated by the flow sheet of Fig. 3 is quite similar to that shown in Fig. 1. The basic difference is that there are two separate stages where the hydrogen gas under pressure is converted to the para form of hydrogen, with the ultimate final conversion of the remaining part of the feedstock being accomplished in a liquid state. The two-stage conversion of the gas to the para form prior to liquefaction aids in the over-all efficiency of the system.

The reverse cycle operation wherein the vaporized liquid product and the unliquefied portion of the expanded, compressed hydrogen feedstock are passed back through the system in inverse order to provide the needed refrigeration is the same in Fig. 3 as in Figs. 1 and 2.

Figure 4:
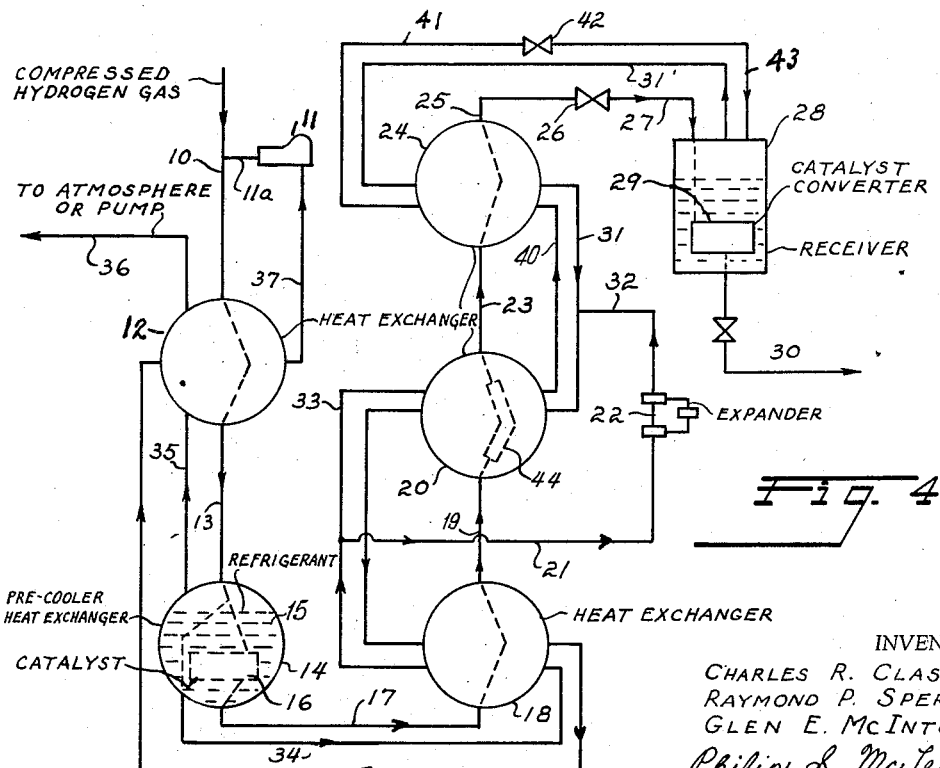
Fig. 4 is a diagrammatic view of a flow sheet illustrating a modified form of the process shown in Fig. 3.

Reference is now to be had to Fig. 4 wherein a modified form of the method shown in Fig. 3 is illustrated by way of a flow sheet. Parts in Fig. 3 which correspond to parts in Fig. 4 will be designated by like reference numerals which will, in turn, possess like reference numerals for corresponding parts in Figs. 1 and 2.

In the form of the invention illustrated by the flow sheet of Fig. 4, a stream of normal hydrogen gas, either under pressure or compressed by means of compressor 11, will be passed to the heat exchanger 12 to effect its initial cooling. The partially cooled hydrogen gas is passed through line 13 into the pre-cooling heat exchanger 14 where it is subjected to further cooling by means of the refrigerant 15 and partial conversion to the para form of hydrogen by contact with the catalyst 16 present therein.

Prior to conversion, the hydrogen feedstock flow is split so that only the finally liquefied portion of the hydrogen feedstock which leaves the system by line 36 passes through the catalyst. The portion of the hydrogen gas converted to the para form in the pre-cooling heat exchanger 14 is passed from the pre-cooling heat exchanger 14 through line 17 into the third heat exchanger 18 for further cooling. The converted portion of the compressed hydrogen feedstock leaves the third heat exchanger 18 by line 19 to the fourth heat exchanger 20. After being further cooled in the fourth heat exchanger 20 and further converted to para hydrogen in the continuous catalyst converter 44 in heat exchanger 20 the converted hydrogen gas is passed through line 23 into the fifth heat exchanger 24, and after further cooling therein, leaves by line 25 where it is expanded through an expansion valve 26. The expansion of the converted portion of the hydrogen gas results in a partial liquefaction of the converted portion. This mixture of converted liquid and gaseous hydrogen is passed through receiver 28 in a closed system where the unliquified portion is condensed causing the unconverted liquid hydrogen in receiver 28 to vaporize. The advantage of splitting off the converted portion of the hydrogen feed-stream and carrying it through to liquefaction in the closed system eliminates the possibility of back conversion at higher temperatures because there is no recirculation of the converted gas. Final conversion of the remaining liquid hydrogen to the para form is obtained by contact with the catalyst 16 in the catalyst converter 29 present therein.

At the same time, the unconverted portion of the cooled hydrogen gas is passed from the pre-cooling heat exchanger 14 to the third heat exchanger 18 through line 34 to effect further cooling of the unconverted portion of the hydrogen gas. The unconverted cooled hydrogen gas leaves the third heat exchanger and is split, with part of the stream going on to the fourth heat exchanger 20 through line 33, with the remaining part passing through line 21 and being expanded isentropically and carried back into the reverse cycle side through line 32 to impart refrigeration to the return side in order to aid in the cooling of the incoming gas.

The remaining unconverted cooled hydrogen gas enters the fourth heat exchanger 20 where it is cooled further by the vaporized liquid hydrogen and the unliquefied portion from receiver 28. The unconverted hydrogen gas leaves the fourth heat exchanger 20 through line 40 for passage into the fifth heat exchanger 24 where a final cooling is accomplished. The cold, unconverted hydrogen gas passes through line 41 into expansion valve 42 where, upon expansion of the cold gas, partial liquefaction of the gas occurs, with the mixture of gas and liquid passing through line 43 into the liquid receiver 28.

The reverse cycle operation wherein the vaporized liquid product is passed back through the system in inverse order to provide the needed refrigeration is the same in Fig. 4 as in Figs. 1–3.

Thus it is seen that the form of the invention shown in Fig. 4 differs from the form shown in Fig. 3 in that in the form of the invention shown in Fig. 4, the converted portion of the hydrogen feed-stream is divided from the main stream in the pre-cooling heat exchanger 14 and passed continuously through to liquefaction. The advantage of this form of the operation is that it eliminates the possibility of back conversion at high temperatures since there is no recirculation of the converted gas.

The operating head pressure in the practice of the present invention will be found to be most efficient and practical in the range from about 16 to about 40 atmospheres with a preferred operating pressure being about 30 to 35 atmospheres particularly when liquid nitrogen is employed as the refrigerant. Temperature values at various points in the system operated in accordance with the present invention will vary due to several variable factors. For example, the different liquid refrigerants employed in the cooling of the incoming feed-stream will result in a considerable temperature variance. Other factors that will result in a variance in the temperature values is operating pressure, expander efficiency, heat exchanger efficiency and the like.

To provide an illustrative and typical temperature range at various points in the system reference is to be had to the following table with liquid nitrogen at a reduced pressure being employed as the refrigerant. The variable factors affecting the temperature at any given point is given:

| Line No. | Temperature, ° C. | Variable Factor |
| --- | --- | --- |
| 10 | 20 | Depends upon ambient conditions. |
| 13 | −188 | Depends upon pressure and refrigerant temperature. |
| 17 | −205 | Liquid nitrogen temperature. |
| 19 and 21 | −217 to −207 | Depends upon feedstock pressure and refrigerant; the higher the pressure, the higher the temperature. |
| 23 | −250 to −244 | Depends upon expander efficiency and expander flow (temperatures for expander flow taken as optimum for a balanced exchanger 20). |
| 25 | −251 to −247 | Same as above. |
| 27 | −253 | Liquid and saturated vapor temperature. |
| 30 | −253 | Liquid hydrogen temperature. |
| 32 | −252 to −245 | Depends upon expander efficiency and operating pressure. |

A typical yield per unit of feedstock flow in accordance with the foregoing table equals 26% with an 80% expander efficiency.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of eqivalency of the claims are intended to be included therein.

We claim:

1. The method for producing the para form of liquid hydrogen comprising passing hydrogen gas under pressure to a first heat exchange zone to effect a cooling thereof, passing the cooled gas to a second refrigerated heat exchange zone to further cool the gas, said second heat exchange zone having a para magnetic oxide catalyst present therein to convert a part of said hydrogen gas passed therein to the para form, passing said partially converted gas through a plurality of heat exchange zones to effect stepwise cooling of said partially converted gas, dividing the incoming gas during the stepwise cooling, passing one part to an expansion zone, passing the expanded part back through at least some of the heat exchange zones to provide refrigeration to cool the incoming gas, passing the remaining part of the gas leaving the last heat exchange zone through an expansion zone to effect at least a partial liquefaction of said gas, passing the partially liquefied gas to a receiving zone, said receiving zone provided with a para magnetic oxide catalyst to convert all of the liquefied hydrogen to the para form, and passing the gaseous hydrogen resulting from the liquefication of the gas back through at least some of the heat exchange zones to effect the cooling of the incoming gas.

2. The method for producing the para form of liquid hydrogen comprising passing hydrogen gas under pressure to a first heat exchange zone to effect a cooling thereof, passing the cooled gas to a second refrigerated heat exchange zone to further cool the gas, said second heat exchange zone having a para magnetic oxide catalyst present therein to convert a part of said hydrogen gas passed therein to the para form, passing said partially converted gas through a plurality of heat exchange zones to effect stepwise cooling of said partially converted gas, dividing the incoming gas during the stepwise cooling, passing one part to an expansion zone, passing the expanded part back through at least some of the heat exchange zones to provide refrigeration to cool the incoming gas, further converting a portion of the hydrogen gas to the para form during the stepwise cooling by contacting same with a paramagnetic oxide catalyst, passing the remaining part of partly converted gas leaving the last heat exchange zone through an expansion zone to effect at least a partial liquefaction of said gas, passing the partially liquefied gas to a receiving zone, said receiving zone provided with a paramagnetic oxide catalyst to convert all of the liquefied hydrogen to the para form, and passing the gaseous hydrogen resulting from the liquefication of the gas back through at least some of the heat exchange zones to effect the cooling of the incoming gas.

3. A method in accordance with claim 2 wherein the gas converted to the para form in the second heat exchanger is divided and passed through the plurality of heat exchange zones in a closed system and expanded through an expansion zone to liquefy same.

4. The method for producing the para form of liquid hydrogen comprising passing hydrogen gas under pressure to a first heat exchange zone to effect a cooling thereof, passing the cooled gas to a second refrigerated heat exchange zone to further cool the gas, said second heat exchange zone having a para magnetic oxide catalyst present therein to convert a part of said hydrogen gas passed therein to the para form, passing said partially converted gas through a plurality of heat exchange zones to effect stepwise cooling of said partially converted gas, dividing the incoming gas during the stepwise cooling, passing one part to an expansion zone, passing the expanded part back through at least some of the heat exchange zones to provide refrigeration to cool the incoming gas, passing the remaining part of the gas leaving the last heat exchange zone through an expansion zone to effect at least a partial liquefaction of said gas, passing the partially liquefied gas to a receiving zone, said receiving zone provided with a para magnetic oxide catalyst to convert all of the liquefied hydrogen to the para form, and passing the gaseous hydrogen resulting from the liquefication of the gas back through at least some of the heat exchange zones to effect the cooling of the incoming gas, the gas converted to the para form in the second heat exchange being divided in paths through a plurality of heat exchange zones in a closed system and expanded through an expansion zone to liquefy same.

5. The method for producing the para form of liquid hydrogen comprising passing hydrogen gas under pressure to a first heat exchange zone to effect a cooling thereof, passing the cooled gas to a second refrigerated heat exchange zone to further cool the gas, said second heat exchange zone having a para magnetic oxide catalyst present therein to convert a part of said hydrogen gas passed therein to the para form, passing said partially converted gas through a plurality of heat exchange zones to effect stepwise cooling of said partially converted gas, further converting a portion of the hydrogen gas to the para form during the stepwise cooling by contacting same with a para magnetic oxide catalyst, passing the partly converted gas leaving the last heat exchange zone through an expansion zone to effect a partial liquefaction of said gas, passing the partially liquefied gas to a receiving zone, said receiving zone provided with a para magnetic oxide catalyst to convert all of the liquefied hydrogen to the para form, and passing the gaseous hydrogen back through at least some of the heat exchange zones to effect the cooling of the incoming gas and the gas converted to the para form in the second heat exchanger being divided in paths through a plurality of heat exchange zones in a closed system and expanded through an expansion zone to liquefy same.

References Cited in the file of this patent

Grilly: Atomic Energy Commission, AECU–2245, November 1952.

Swenson: J. Chem. Phys. 18, 520–2 (1950).

Squires et al.: J. Chem. Phys. 22, 754 (1954).